US009124305B2

(12) United States Patent
Burrell et al.

(10) Patent No.: US 9,124,305 B2
(45) Date of Patent: Sep. 1, 2015

(54) DEVICE, METHOD AND SYSTEM FOR EFFICIENTLY POWERING A NEAR FIELD COMMUNICATION DEVICE

(71) Applicant: BLACKBERRY LIMITED, Waterloo (CA)

(72) Inventors: Douglas James Arthur Burrell, Waterloo (CA); Kevin Howard Orr, Elmira (CA); Ahmed Abdelsamie, Nepean (CA); Mikolaj Matthew Mruk, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 1 day.

(21) Appl. No.: 14/016,410

(22) Filed: Sep. 3, 2013

(65) Prior Publication Data

US 2015/0065037 A1 Mar. 5, 2015

(51) Int. Cl.

| | |
|---|---|
| ***H04B 5/00*** | (2006.01) |
| ***G06K 19/077*** | (2006.01) |
| ***H02J 5/00*** | (2006.01) |
| ***H02J 7/02*** | (2006.01) |
| ***H04B 5/06*** | (2006.01) |
| ***G06K 7/10*** | (2006.01) |
| *H04W 4/00* | (2009.01) |
| *H02J 7/00* | (2006.01) |

(52) U.S. Cl.

CPC .......... *H04B 5/0031* (2013.01); *G06K 7/10158* (2013.01); *G06K 7/10217* (2013.01); *G06K 7/10237* (2013.01); *G06K 19/07749* (2013.01); *H02J 5/005* (2013.01); *H02J 7/025* (2013.01); *H04B 5/0037* (2013.01); *H04B 5/0056* (2013.01); *H04B 5/0081* (2013.01); *H04B 5/06* (2013.01); *H02J 2007/005* (2013.01); *H04W 4/008* (2013.01)

(58) Field of Classification Search

CPC ............................... H04B 5/0037; H02J 5/005
USPC .......... 455/522, 41.1, 41.2; 307/104; 320/108
See application file for complete search history.

(56) References Cited

U.S. PATENT DOCUMENTS 8,489,199 B2 7/2013 Rofougaran
2010/0085160 A1 4/2010 Fu
2011/0156640 A1 6/2011 Moshfeghi (Continued)

FOREIGN PATENT DOCUMENTS

WO 2008017041 A2 2/2008

OTHER PUBLICATIONS

"Extened European Search Report", dated Nov. 27, 2014 for EP Application No. 141833467-1852.

*Primary Examiner* — Tuan Pham
(74) *Attorney, Agent, or Firm* — Perry + Currier, Inc.

(57) ABSTRACT

A device, method and system for efficiently powering a near field communication device are provided. The device comprises: a module configured to: exchange data with a near field communication (NFC) device; and transmit energy to the NFC device; and, a processor configured to: receive, using the module, energy data from the NFC device, the energy data comprising data for determining a difference between a current energy level of an energy storage apparatus at the NFC device and a given amount of energy for performing a given function at the NFC device; determine the difference from the energy data; and, transmit, using the module, an amount of energy corresponding to the difference, to the NFC device.

20 Claims, 12 Drawing Sheets

(56) References Cited

U.S. PATENT DOCUMENTS

2012/0217971 A1* 8/2012 Deluca .......................... 324/426
2012/0293118 A1* 11/2012 Kim et al. .................... 320/108
2013/0005245 A1* 1/2013 Royston ...................... 455/41.1

* cited by examiner

195

| Function | Energy |
|---|---|
| Refresh Apparatus 158 | 505 |
| Turn on Apparatus 158 | 601 |
| Transmit Data from Memory 152 | 603 |

Fig. 6

DEVICE, METHOD AND SYSTEM FOR EFFICIENTLY POWERING A NEAR FIELD COMMUNICATION DEVICE

FIELD

The specification relates generally to devices, and specifically to a device, method and system for efficiently powering a near field communication device.

BACKGROUND

Passive near field communication (NFC) devices are powered from energy transferred to the NFC devices from another device, such as mobile electronic devices. However, such powering of an NFC device by a mobile electronic device can quickly drain a battery of the mobile electronic device.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 6 depicts data stored at the device of FIG. 1 (and alternatively, the NFC device) associating given functions implementable at the NFC device to amounts of energy for implementing the given functions, according to non-limiting implementations.

Figure 9:
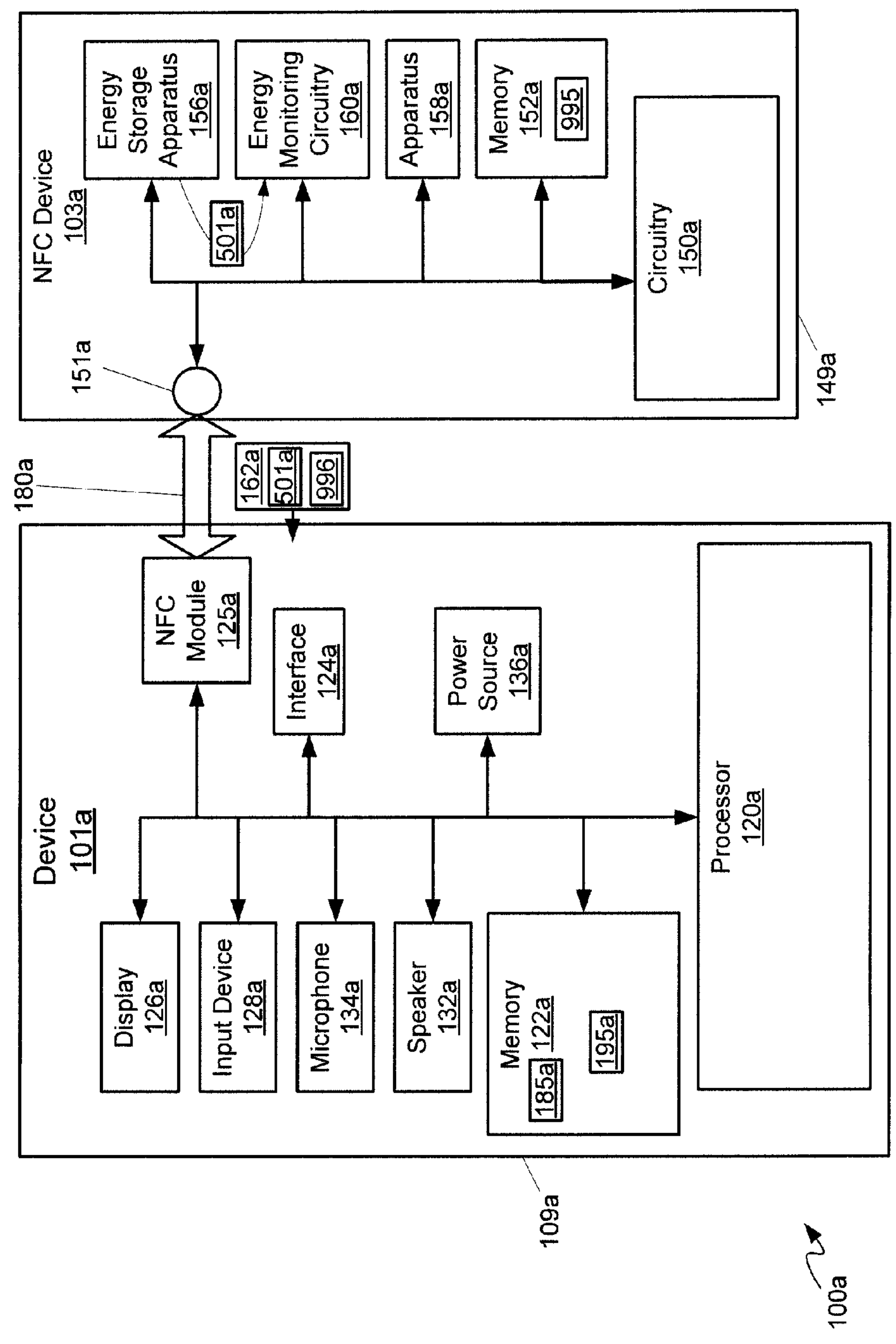

FIG. 9 depicts a schematic diagram of a system that includes a near field communication (NFC) device and a device for efficiently powering the NFC device, the device receiving, from the NFC device, energy data comprising: the current energy level of the energy storage apparatus at the NFC device, and an indication of the given function to be performed at the NFC device, according to non-limiting implementations.

Figure 10:
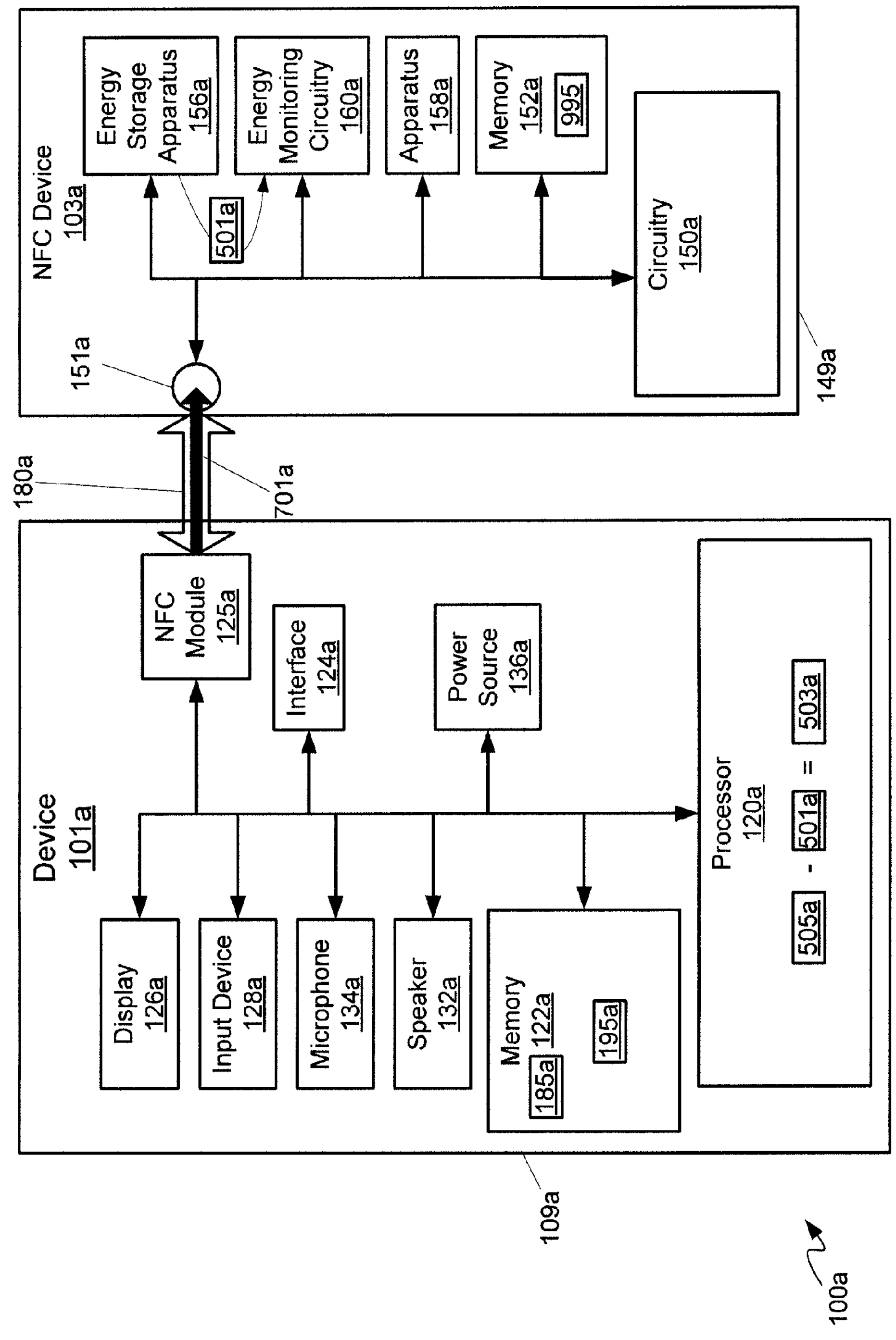

FIG. 10 depicts the system of FIG. 9, with the device transmitting an amount of energy to the NFC device, according to non-limiting implementations.

Figure 11:
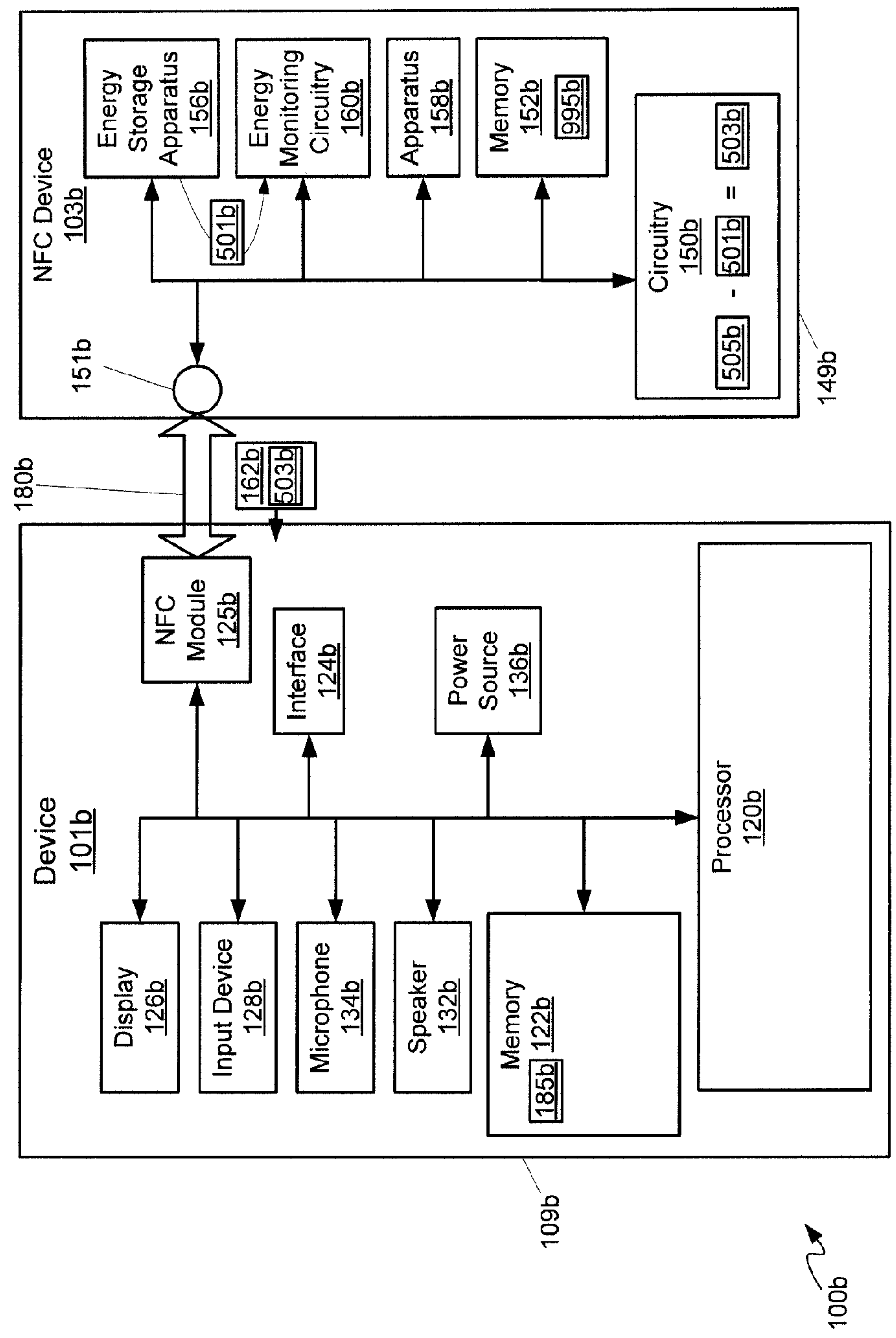

FIG. 11 depicts a schematic diagram of a system that includes a near field communication (NFC) device and a device for efficiently powering the NFC device, the device receiving, from the NFC device, energy data comprising: a difference between a current energy level of an energy storage apparatus at the NFC device and a given amount of energy for performing a given function at the NFC device, according to non-limiting implementations.

Figure 12:
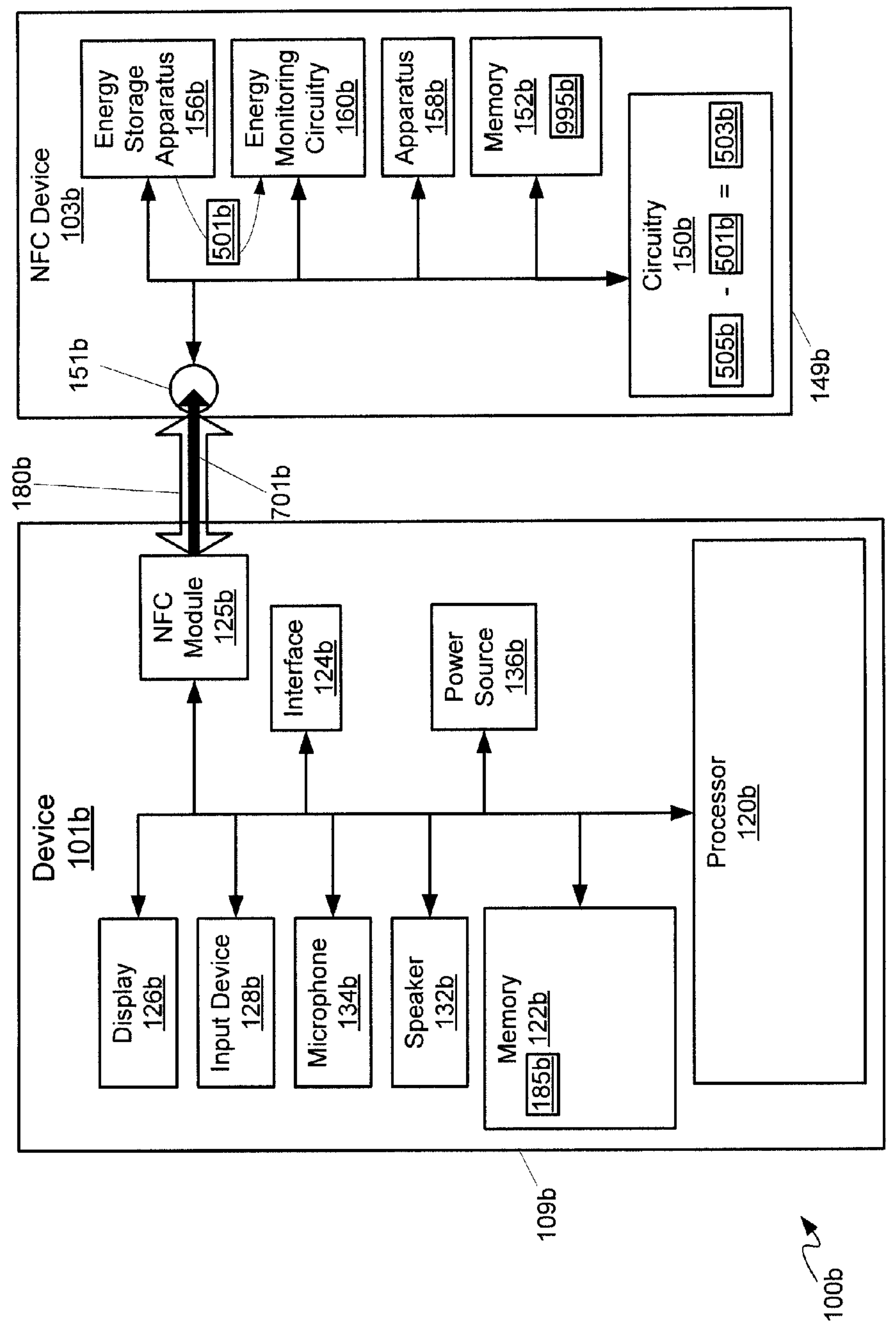

FIG. 12 depicts the system of FIG. 11, with the device transmitting an amount of energy to the NFC device, according to non-limiting implementations.

DETAILED DESCRIPTION

In general, this disclosure is directed to a device, and in particular a mobile electronic device, for efficiently powering a near field communication (NFC) device. In general, mobile electronic devices represent electronic devices that are readily movable from place to place. In particular, such devices can include an NFC module and/or NFC reader/writer that can be used to power and read NFC devices. However, powering of the NFC devices can quickly drain a battery of the mobile electronic device as the device generally charges an energy storage apparatus at the NFC device to maximum capacity. Hence, this specification describes various implementations of a device that can efficiently power an NFC device and extend the battery life of the mobile electronic device.

In this specification, elements may be described as "configured to" perform one or more functions or "configured for" such functions. In general, an element that is configured to perform or configured for performing a function is configured to perform the function, or is suitable for performing the function, or is adapted to perform the function, or is operable to perform the function, or is otherwise capable of performing the function.

Furthermore, as will become apparent, in this specification certain elements may be described as mated, coupled or connected physically, electronically, communicatively, mechanically or any combination thereof, according to context. Hence, in this disclosure, "enabled to mate" refers to a physical coupling and typically a communicative coupling as well. In general, components that are communicatively coupled are configured to communicate (that is, they are capable of communicating) in any fashion for any duration, such as by way of electric signals, wireless signals, or any combination thereof. The communication may be one-way or two-way communication. Components are "physically coupled" when they are attached or connected or joined to one another, in any fashion, whether releasably or substantially permanently, so that physical activity of one component generally affects the other. The physical attachment may be direct or by way of one or more intermediate elements. According to context, two components that are physically coupled may behave as a single element. In some cases, physically coupled elements may be integrally formed, e.g., part of a single-piece article that may share structures and materials. In other cases, physically coupled elements may comprise discrete components that may be fastened together in any fashion. Physical coupling may also include a combination of discrete components fastened together, and components fashioned as a single piece.

In this specification, elements may be described as "obscured" and/or "exposed". In general, an element that is obscured is one or more of not visible to a user, not viewable, covered, blocked, concealed, hidden, and the like. Similarly, an element that is exposed is one or more of visible to a user, uncovered, revealed, viewable, and the like.

Further, in this specification, NFC technologies are described which can, in some implementations, refer to a specific standard including, but not limited, to one or more of ISO/IEC 18092/ECMA-340, ISO/IEC 14443, and ISO/IEC 21481/ECMA-352. In general, however, any short range RF technology for exchanging and/or transmitting and/or receiving data and/or power using contactless integrated circuits are within the scope of present implementations, including, but not limited to, one or more of induction based contactless technologies, NFC technologies, RFID (radio-frequency identifier) technologies and the like.

An aspect of the specification provides a device comprising: a module configured to: exchange data with a near field communication (NFC) device; and transmit energy to the NFC device; and, a processor configured to: receive, using the module, energy data from the NFC device, the energy data comprising data for determining a difference between a current energy level of an energy storage apparatus at the NFC device and a given amount of energy for performing a given function at the NFC device; determine the difference from the energy data; and, transmit, using the module, an amount of energy corresponding to the difference, to the NFC device.

The energy data can comprise one or more of the current energy level of the energy storage apparatus at the NFC device; the given amount of energy for performing the given function at the NFC device; and, the difference there between.

The amount of energy, corresponding to the difference, which is transmitted to the NFC device can be one or more of: about the same as the difference; greater than the difference; and, about the difference plus a given percentage of the difference.

The processor can be further configured to: determine a current energy level of a power source at the device; and, when one or more of: the amount of energy is greater than a current energy level of the power source; and, the amount of energy is within a given percentage of the current energy level of the power source, control a display of the device to provide a prompt for charging the power source.

The processor can be further configured to, when the amount of energy to be transmitted to the NFC device exceeds a second amount of energy for completely charging the energy storage apparatus at the NFC device, transmit, using the module, the second amount of energy to the NFC device rather than the amount of energy corresponding to the difference.

The processor can be further configured to: estimate when the given function is to occur; and begin transmission of the amount of energy at a time prior to an estimated time for implementing the given function, such that a difference between the time when transmission of amount of energy begins, and the estimated time for implementing the given function, is greater than or about equal to an amount of time for transmitting amount of energy.

The device can further comprise a memory for storing data corresponding to amounts of energy for performing respective functions at the NFC device. The processor can be further configured to receive, from the module, the energy data comprising: the current energy level of the energy storage apparatus at the NFC device and an indication of the given function to be performed at the NFC device. The processor can be further configured to determine the difference by retrieving the given amount of energy for performing the given function at the NFC device from the memory using the indication.

The given amount of energy for performing the given function can be based on one or more of statistics and historical data for previously performing the given function.

Another aspect of the specification provides a method comprising: at a device comprising: a module configured to: exchange data with a near field communication (NFC) device; and transmit energy to the NFC device; and, a processor, receiving, at the processor, using the module, energy data from the NFC device, the energy data comprising data for determining a difference between a current energy level of an energy storage apparatus at the NFC device and a given amount of energy for performing a given function at the NFC device; determining, using the processor, the difference from the energy data; and, transmitting, using the module, an amount of energy corresponding to the difference, to the NFC device.

The energy data can comprise one or more of the current energy level of the energy storage apparatus at the NFC device; the given amount of energy, for performing the given function at the NFC device; and, the difference there between.

The amount of energy, corresponding to the difference, which is transmitted to the NFC device can be one or more of: about the same as the difference; greater than the difference; and, about the difference plus a given percentage of the difference.

The method can further comprise: determining a current energy level of a power source at the device; and, when one or more of: the amount of energy is greater than a current energy level of the power source; and, the amount of energy is within a given percentage of the current energy level of the power source, controlling a display of the device to provide a prompt for charging the power source.

The method can further comprise, when the amount of energy to be transmitted to the NFC device exceeds a second amount of energy for completely charging the energy storage apparatus at the NFC device, transmitting, using the module, the second amount of energy to the NFC device rather than the amount of energy corresponding to the difference.

The method can further comprise estimating when the given function is to occur; and, beginning transmission of the amount of energy at a time prior to an estimated time for implementing the given function, such that a difference between the time when transmission of amount of energy begins, and the estimated time for implementing the given function, is greater than or about equal to an amount of time for transmitting amount of energy.

The method can further comprise, storing at a memory of the device, data corresponding to amounts of energy for performing respective functions at the NFC device. The method can further comprise receiving, from the module, the energy data comprising: the current energy level of the energy storage apparatus at the NFC device and an indication of the given function to be performed at the NFC device. The method can further comprise, determining the difference by retrieving the given amount of energy for performing the given function at the NFC device from the memory using the indication.

Yet a further aspect of the specification provides a computer program product, comprising a computer usable medium having a computer readable program code adapted to be executed to implement a method comprising: at a device comprising: a module configured to: exchange data with a near field communication (NFC) device; and transmit energy to the NFC device; and, a processor, receiving, at the processor, using the module, energy data from the NFC device, the energy data comprising data for determining a difference between a current energy level of an energy storage apparatus at the NFC device and a given amount of energy for performing a given function at the NFC device; determining, using the processor the difference from the energy data; and, transmitting, using the module, an amount of energy corresponding to the difference, to the NFC device. The computer usable medium can comprise a non-transitory computer usable medium.

Figure 1:
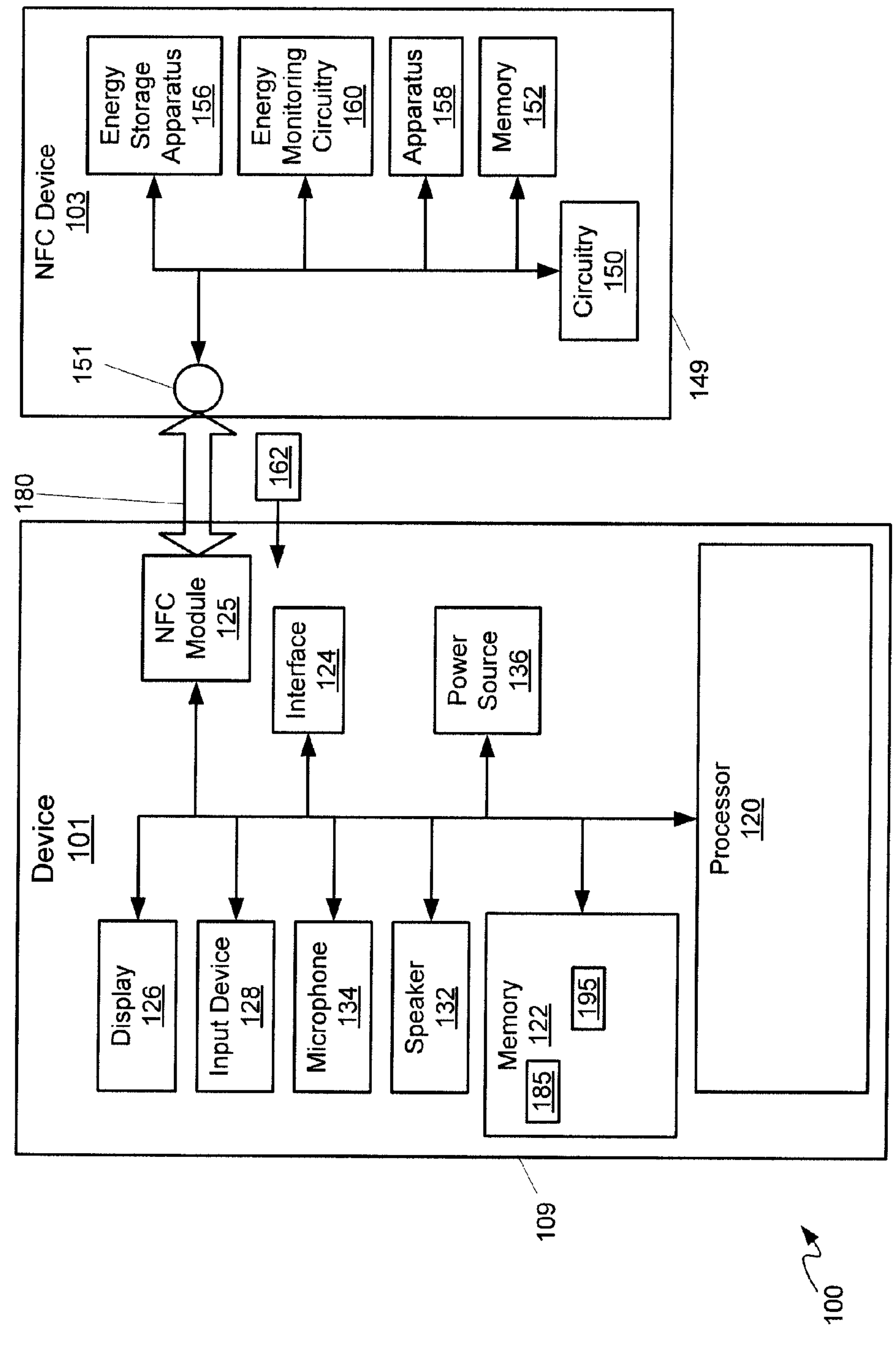
FIG. 1 depicts a block schematic diagram of a system that includes a near field communication (NFC) device and a device for efficiently powering the NFC device, according to non-limiting implementations.

FIG. 1 depicts a system 100 that includes a device 101 and an NFC device 103. Device 101 is generally configured to efficiently power NFC device 103. Device 101 comprises a housing 109, which houses a processor 120 interconnected with a memory 122, a communications interface 124, a near field communication (NFC) module 125 (and/or a short range RF (radio-frequency) sensor), a display 126, and an input device 128, and optionally a speaker 132, and a microphone 134. Device 101 further comprises a power source 136, including, but not limited to, a battery. Communications interface 124 will be interchangeably referred to as interface 124. NFC module 125 is generally configured to exchange data with NFC device 103; and transmit energy to NFC device 103, as well as other NFC devices. As such, NFC device 103 is correspondingly configured to exchange data with NFC module 125 and to receive energy therefrom, as described in further detail below.

NFC device 103 comprises a housing 149, which houses NFC circuitry 150 interconnected with an NFC antenna 151, a memory 152, an energy storage apparatus 156 and optionally an apparatus 158 that can include, but is not limited to, a display, a bi-stable display, an electrophoretic display, a low power display, an indicator, a speaker and the like. In some implementations, NFC device 103 can comprise more than one NFC antenna, for example an NFC antenna for different communication frequencies. NFC device 103 can generally comprise a passive NFC device and hence, in order to perform functions at NFC device 103, including, but not limited to powering apparatus 158, energy storage apparatus 156 receives and stores energy from NFC module 125 via antenna 151, as described below, which is in turn used to perform the functions such as powering apparatus 158. In these implementations, in general energy storage capacity of energy storage apparatus 156 is less than that of power source 136 and indeed, energy storage apparatus 156 generally stores energy for short periods of time relative to power source 136. However, in other implementations, NFC device 103 can comprise an active NFC device and further comprise a battery, a super capacitor, and the like and/or alternatively energy storage apparatus 156 can comprise a battery, a super capacitor and the like.

Further, a given amount of energy at energy storage apparatus 156 can be needed in order to perform a respective function. Hence, NFC device 103 can comprise energy monitoring circuitry 160 for monitoring an amount of energy stored at energy storage apparatus 156. Further, circuitry 150 can prevent a function from being implemented until energy storage apparatus 156 stores at least the given amount of energy for implementing the function, as determined by energy monitoring circuitry 160. While energy monitoring circuitry 160 is depicted in FIG. 1 as separate from circuitry 150, in other implementations circuitry 150 can comprise energy monitoring circuitry 160 and/or circuitry 150 and energy monitoring circuitry 160 can be combined.

Returning to device 101, processor 120 is generally configured to: receive, using NFC module 125, energy data 162 from NFC device 103, energy data 162 comprising data for determining a difference between a current energy level of energy storage apparatus 156 at NFC device 103 and a given amount of energy for performing a given function at NFC device 103; determine the difference from energy data 162; and, transmit, using NFC module 125, an amount of energy corresponding to the difference, to NFC device 103. Energy data 162 can comprise one or more of: the current energy level of energy storage apparatus 156 at NFC device 103; the given amount of energy for performing the given function at NFC device 103; and, the difference there between (i.e. the difference between the current energy level of energy storage apparatus 156 at NFC device 103 and the given amount of energy for performing the given function at NFC device 103).

Bringing NFC module 125 and NFC device 103 into proximity, or into actual physical contact, can provide an operationally easy interface to set up, and initiate a wireless NFC link 180, such that NFC module 125 and NFC device 103 communicatively couple and/or communicatively mate. For example, each of NFC module 125 and NFC device 103 comprise induction devices and/or antennas, such as antenna 151, for communicating and/or transmitting RF signals using induction. Detection of NFC module 125 and NFC device 103 by each other, via induction, can trigger execution of an NFC query and authorization process using link 180 and, upon optional authorization, establishment of a uni- or bi-directional wireless communication session between NFC module 125 and NFC device 103. Further, power and/or energy can be transferred, within link 180, from NFC module 125 to NFC device 103, via induction, to power circuitry 150, apparatus 158, energy monitoring circuitry 160 and the like at NFC device 103, the power and/or energy stored, at least temporarily, at energy storage apparatus 156.

The NFC module 125 and NFC device 103 can be aligned and/or matched in a single touch, or other gesture adapted to bring the devices into suitably close proximity (sometimes termed a "kiss" gesture, and/or a "tap" gesture because the NFC module 125 and NFC device 103 typically touch and/or "kiss" and/or "tap" each other or are very close and in adjacent proximity). A non-limiting example of a suitable proximity for such implementations may be in the range of about 10 to about 20 mm, and/or less than about 20 mm, but the range may be more or less depending on the strength of an RF field generated by NFC module 125 and the purposes for which the NFC module 125 and NFC device 103 and/or system 100 is intended. In yet further implementations, device 101 and NFC module 103 can be configured to mate (for example, see FIG. 2) so that energy transfer from device 101 to NFC module 103 can occur over a period of time; indeed, a "kiss" gesture and/or a "tap" gesture may only account for a relatively quick exchange of data without a significant energy exchange.

In general, link 180 is established when an NFC antenna (not depicted) at NFC module 125 is aligned with NFC antenna 151 at NFC device 103, as illustrated in FIG. 1. Using induction one, or both, of NFC module 125 and NFC device 103 causes a voltage variation, or other signal, to be generated, and transmitted to processor 120 and/or corresponding NFC circuitry 150 at NFC device 103, so as to activate processor 120 and/or NFC circuitry 150 to communicate with the other device using the protocol of an associated NFC Stack or other wireless communication(s) subsystem or device(s). The NFC module 125 and NFC device 103 can then communicate with each other using any NFC protocol suitable for the intended purpose.

Establishment of NFC communications sessions between NFC module 125 and NFC device 103 can be optionally conditioned on suitably-adapted authorizations, using, for example, PIN numbers and/or other security keys.

Interaction between active NFC module 125 and NFC device 103 as shown, for example, in FIG. 1, can be considered peer-to-peer NFC interactions.

Detection of NFC device 103 by NFC module 125 (and/or device 101) can also activate or change functionality of device 101. For example, detection of NFC device 103 can cause device 101 to enter a different mode than before NFC device 103 was detected, where some functionality is turned on, and other functionality is turned off. Hence, in these scenarios, accurate detection of NFC device 103 can be critical, especially when there is an expectation on the part of a user of device 101 that detection of NFC device 103 will cause device 101 to change functionality, for example, to either provide data regarding NFC device 103 at display 126 and/or enter a mode that device 101 is programmed to enter upon detection of NFC device 103.

It is appreciated that FIG. 1 further depicts a schematic diagram of device 101, which will hereafter be described in further detail. It should be emphasized that the structure of device 101 in FIG. 1 is purely an example. For example, as depicted in FIG. 1, it is contemplated that device 101 comprises a device that can be used for implementing both wireless voice (e.g. telephony) and wireless data communications (e.g. email, web browsing, text, and the like), as well as any other specialized functions, including, but not limited, to one or more of, computing, and/or entertainment related functions. In particular, in some implementations, device 101 can comprise a dedicated NFC reader/writer, used for one or more of commercial transactions, inventory solutions and the like.

Housing 109 can comprise any housing, casing, and the like. It is appreciated that device 101 can be portable (readily movable from place to place) and, in some implementations, device 101 can be handheld (sized and shaped to be held or carried in a human hand, and typically used while so held or carried); hence, housing 109 can be configured for a type of device 101. In general, housing 109 encloses or houses the components of device 101; however some components can be visible via apertures, windows and the like in housing 109. For example, display 126 is generally visible.

At least one input device 128 is generally configured to receive input data, and can comprise any suitable combination of input devices, including but not limited to a keyboard, a keypad, a pointing device, a mouse, a track wheel, a trackball, a touchpad, a touch screen and the like. Other input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory, and the like) and a volatile storage unit (e.g. random access memory ("RAM"), and the like). Programming instructions that implement the functional teachings of device 101 as described herein are typically maintained, persistently, in memory 122 and used by processor 120 which makes appropriate utilization of volatile storage during the execution of such programming instructions. In some implementations, processor 120 comprises at least a portion of memory 122, for example as on-board random access memory (RAM). It is further appreciated that memory 122 is an example of computer readable media that can store programming instructions executable on processor 120. Furthermore, memory 122 is also an example of a memory unit and/or memory module.

In particular, it is appreciated that memory 122 stores application 185, that, when processed by processor 120, enables processor 120 to: receive, using NFC module 125, energy data 162 from NFC device 103, energy data 162 comprising data for determining a difference between a current energy level of energy storage apparatus 156 at NFC device 103 and a given amount of energy for performing a given function at NFC device 103; determine the difference from energy data 162; and, transmit, using NFC module 125, an amount of energy corresponding to the difference, to NFC device 103.

In some implementations, as depicted, memory 122 can store data 195 corresponding to amounts of energy for performing respective functions at NFC device 103. For example, when apparatus 158 comprises a bi-stable display, data 195 can include, but is not limited to, data corresponding to an amount of energy for refreshing the bi-stable display. Data 195 can be stored as a table, a database, a look-up table, and the like; further, data 195 can be configured at memory 122 at a factory and/or when device 101 is provisioned with application 185 and/or when application 185 is installed. Further, data 195 can be updated based on one or more of statistics and historical data for performing respective functions at NFC device 103, as received from NFC device 103, for example in energy data 162. Hence, as an amount of energy for performing a specific function at NFC device 103 changes (i.e. increases or decreases as components of NFC device 103 age), data 195 can be updated.

Processor 120 can be further configured to communicate with display 126, and optional microphone 134 and optional speaker 132. Display 126 comprises one or more of a flat panel display, an LCD (liquid crystal display), a plasma display, an OLED (organic light emitting diode) display, a capacitive touchscreen, a resistive touch screen, a CRT (cathode ray tube) display, and the like. Optional microphone 134 comprises a microphone for receiving sound data at device 101. Optional speaker 132 comprises a speaker for providing sound data, audible alerts, audible communications from remote communication devices, and the like, at device 101. Processor 120 can also control one or more of display 126 and optional speaker 132 to provide notifications. In some implementations, device 101 can further comprise an indicator and/or notification device (not depicted), for example an LED (light emitting diode), a light and the like that can also be configured to provide notifications.

Processor 120 can be further configured to communicate with NFC module 125 which is configured to wirelessly communicate with at least one NFC device 103, as described above. While not depicted, NFC module 125 can comprise an NFC antenna, similar to antenna 151, and hence, in these implementations, NFC module 125 comprises an NFC interface for wirelessly transmitting and receiving NFC signals via an NFC antenna. Indeed, in general, NFC module 125 can include, but is not limited to, an induction based wireless reader, a short range RF reader, an RF reader/writer, an NFC reader, and NFC reader/writer, an NFC antenna, a RFID (radio-frequency identifier) reader, an RFID reader/writer and the like. In other words, while the term "NFC" can refer to a specific standard, present implementations are not so limited, and a device 101 can include any short range RF reader configured to detect corresponding short range RF devices.

Interface 124 (and/or another communications interface, not depicted) can be implemented as one or more radios and/or connectors and/or network adaptors, configured to wirelessly communicate with one or more communication networks (not depicted) and/or wireless communication networks and/or wired communication networks and/or wireless transceivers. It will be appreciated that, in these implementations, interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WiFi links, WiMax links, packet based links, the Internet, analog networks, the PSTN (public switched telephone network), access points, and the like, and/or a combination. When interface 124 is configured to communicate with one or more communication networks, interface 124 can comprise further protocol specific antennas therefor (not depicted). In some implementations, however, interface 124 can be optional.

Device 101 further comprises power source 136 which can include, but is not limited to, a battery, a power pack, and the like. Energy transferred from device 101 to NFC device 103 generally originates at power source 136. Hence, when device 101 powers NFC device 103, energy at power source 136 is reduced.

In any event, it should be understood that a wide variety of configurations for device 101 are contemplated.

NFC device 103 generally comprises a battery-less passive NFC device. Circuitry 150 can include, but is not limited to, an NFC chip, such as a memory-based chip or a processor-based chip. Circuitry 150 can be adapted to carry out actions necessary for communication using an NFC protocol including but not limited to modulation, demodulation, encoding and decoding. Further, NFC device 103 can be embedded in another device, apparatus or structure, such as a poster, an article of clothing, an inventory item, a product, and the like.

NFC antenna 151 can, in some implementations, be tuned for 13.56 MHz, and a corresponding antenna at NFC module 125 can be tuned to the same frequency. However, other frequencies are in the scope of present implementations, and can depend on the technology implemented at each of NFC device 103 and NFC module 125. In general, each of NFC antenna 151 and an antenna at NFC module 125 are tuned to the same frequency and implement the same technology.

Hence, NFC module 125 and NFC device 103 are generally compatible so that each of NFC module 125 and NFC device 103 are configured with similar technologies and/or protocols and/or standards.

In general, NFC device 103 can include, but is not limited to, an induction based wireless device, a short range RF device, an NFC device, an NFC antenna, an RFID (radio-frequency identifier) device, and the like. In other words, while the term "NFC" can refer to a specific standard, present implementations are not so limited, and a NFC device 103 can include any short range RF device configured to communicate with corresponding short range RF sensors.

Memory 152 can include both volatile and persistent (i.e., non-transient) media, which can be read by NFC module 125, and can store any data suitable for a given purpose including, but not limited to, an identifier of NFC device 103, energy data 162, information associated with apparatus 158, event information, product information, network addresses, telephone numbers, and/or any other data to be communicated to device 101 and/or a user thereof.

Energy storage apparatus 156 can comprise one or more of a capacitor, a super-capacitor, an energy storage cell and the like, and/or a plurality thereof, as well as any associated circuitry. While NFC device 103 is generally battery-less, and uses energy received from device 101 to power components thereof, energy storage apparatus 156 can comprise a chemical based storage apparatus for storing energy received from device 101.

Energy monitoring circuitry 160 is generally configured to monitor energy storage apparatus 156 and determine an amount of energy stored therein. In some implementations, energy monitoring circuitry 160 can be further configured as a charging manager that manages balancing of energy cells at energy storage apparatus 156, monitors critical parameters such as over-voltages, short circuits, over temperature conditions, and the like.

Housing 149 and apparatus 158 can be inter-related and can depend on the overall function of NFC device 103. For example, attention is next directed to FIG. 2 which depicts perspective view of system 100 including a front view of device 101 and a rear view of particular non-limiting implementations of NFC device 103. As depicted, NFC device 103 comprises one or more of a holster, a case, and a carrying solution that can be mated with device 101 to carry and/or protect device 101 and/or provide additional functionality associated with device 101. For example, as depicted, NFC device 103 can be "snapped" onto a rear of device 101, as indicated by arrow 201, so that the rear of NFC device 103 covers at least a portion of the rear of device 101; as depicted, housing 149 comprises one or more apertures for enabling camera devices (not depicted) and the like at a rear of device 101 to be exposed and/or not obscured. Hence, in these implementations, housing 149 comprises a housing which can be mated with device 101. Further, apparatus 158 can comprise one or more of a display, a bi-stable display, an electrophoretic display, a low power display, an indicator and the like which is viewable on an external surface of housing 149.

In particular, when apparatus 158 comprises a display, data provided at the display can be received from device 101 in link 180, such that apparatus 158 can be configured as an additional display and/or indicator for device 101. For example, as depicted, apparatus 158 comprises bi-stable display showing a coupon; however the bi-stable display can display any data received from device 101 via link 180 including, but not limited to, maps and the like.

Figure 2:
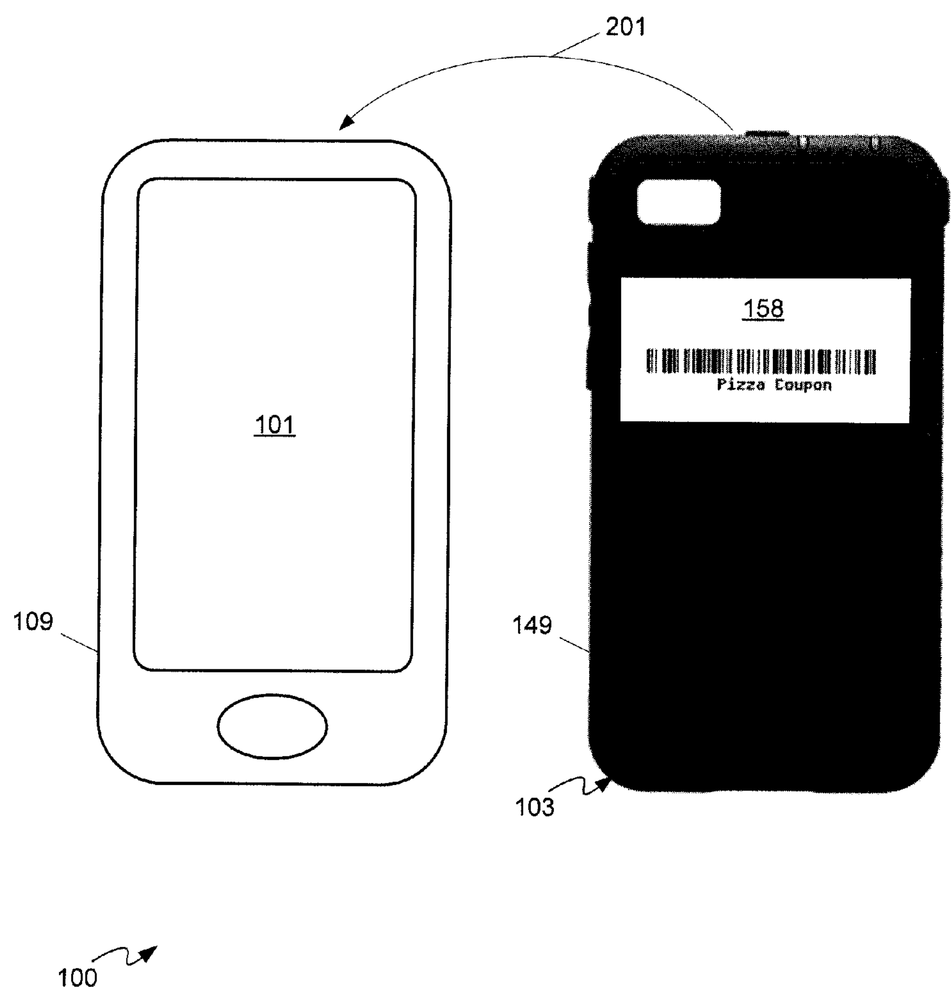
FIG. 2 depicts a perspective view of the system of FIG. 1, including a front view of the device and a rear view of particular non-limiting implementations of the NFC device, according to non-limiting implementations.

Further, while not depicted, it is assumed that internal components for each of device 101, and NFC device 103 are present in FIG. 2, but located internal to, respectively, housing 109 and housing 149.

However, in other implementations, NFC device 103 can be configured for other functionality and/or scenarios for interacting with device 101 and need not comprise a holster, case, carrying solution and the like. Similarly, apparatus 158 need not comprise a display, and indeed apparatus 158 can be optional. Similarly, device 101 need not be a mobile electronic device; rather device 101 can comprise a docking station for docking NFC device 103.

In any event, it should be understood that a wide variety of configurations for NFC device 103 are contemplated.

In any event, returning to FIG. 1, NFC module 125 "reads" energy data 162 from NFC device 103 in link 180. For example, energy data 162 is wirelessly transmitted by NFC device 103 to NFC module 125 using link 180; energy data 162 can then be processed by processor 120 to determine a difference between a current energy level of energy storage apparatus 156 at NFC device 103 and a given amount of energy for performing a given function at NFC device 103. In addition to energy data, any other data stored at memory 122 can be transferred to device 101 in link 180, for example the aforementioned product information, event information, address information and the like. Energy data 162 is generally transmitted when link 180 is established and/or when NFC device 103 has received enough power in link 180 to transmit energy data 162 and/or when device 101 queries NFC device 103 for energy data 162 and/or when circuitry 150 at NFC device 103 determines that a given function is to occur.

Further, data can be received at NFC device 103 from device 101 for display at apparatus 158 (when apparatus 158 comprises a display), for example, coupon data, map data etc.

Figure 3:
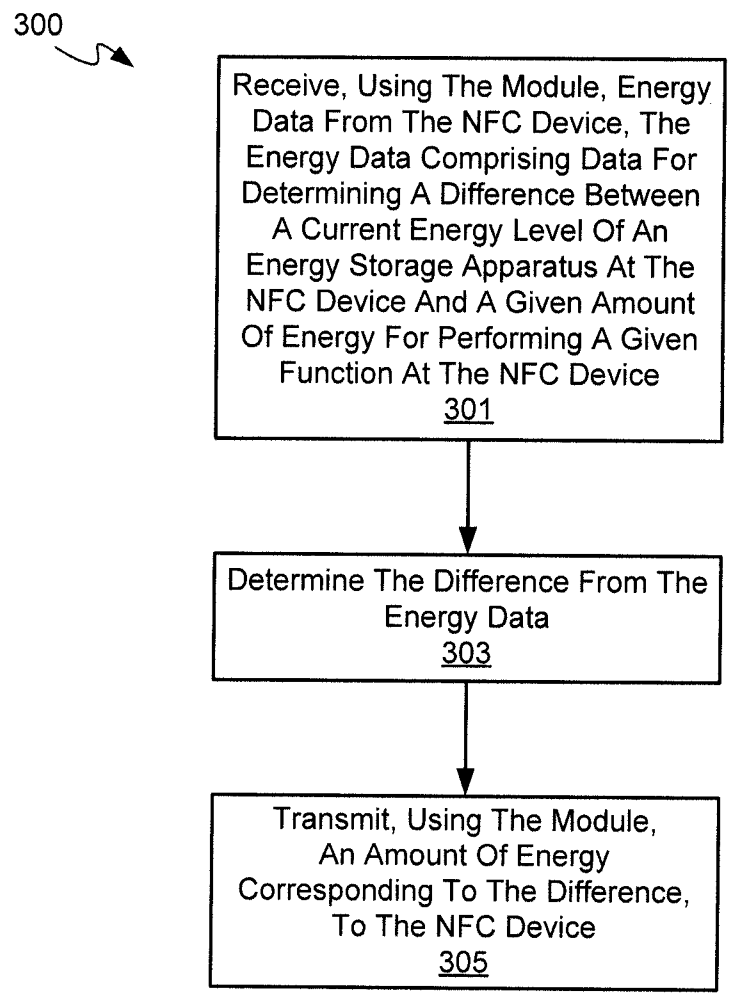
FIG. 3 depicts a flowchart of a method for efficiently powering an NFC device, according to non-limiting implementations.

Attention is now directed to FIG. 3 which depicts a flowchart illustrating a method 300 for efficiently powering an NFC device, according to non-limiting implementations. In order to assist in the explanation of method 300, it will be assumed that method 300 is performed using system 100. Furthermore, the following discussion of method 300 will lead to a further understanding of system 100 and its various components. However, it is to be understood that system 100, and/or method 300 can be varied, and need not work exactly as discussed herein in conjunction with each other, and that such variations are within the scope of present implementations. It is appreciated that, in some implementations, method 300 is implemented in device 101 by processor 120, for example by implementing application 185.

It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood that method 300 can be implemented on variations of system 100 as well.

It is presumed in method 300 that link 180 has been established and further that energy monitoring circuitry 160 has determined a current energy level of energy storage apparatus 156.

At block 301, processor 120 receives, using NFC module 125, energy data 162 from NFC device 103, energy data 162 comprising data for determining a difference between a current energy level of energy storage apparatus 156 at NFC device 103 and a given amount of energy for performing a given function at NFC device 103.

At block 303, processor 120 determines the difference from energy data 162.

At block 305, processor 120 transmits, using NFC module 125, an amount of energy corresponding to the difference, to NFC device 103.

Method 300 will now be described in detail with reference to FIGS. 4 to 12, each FIGS. 4 to 5, and 7 to 12 being substantially similar to FIG. 1, with like elements having like numbers.

Figure 4:
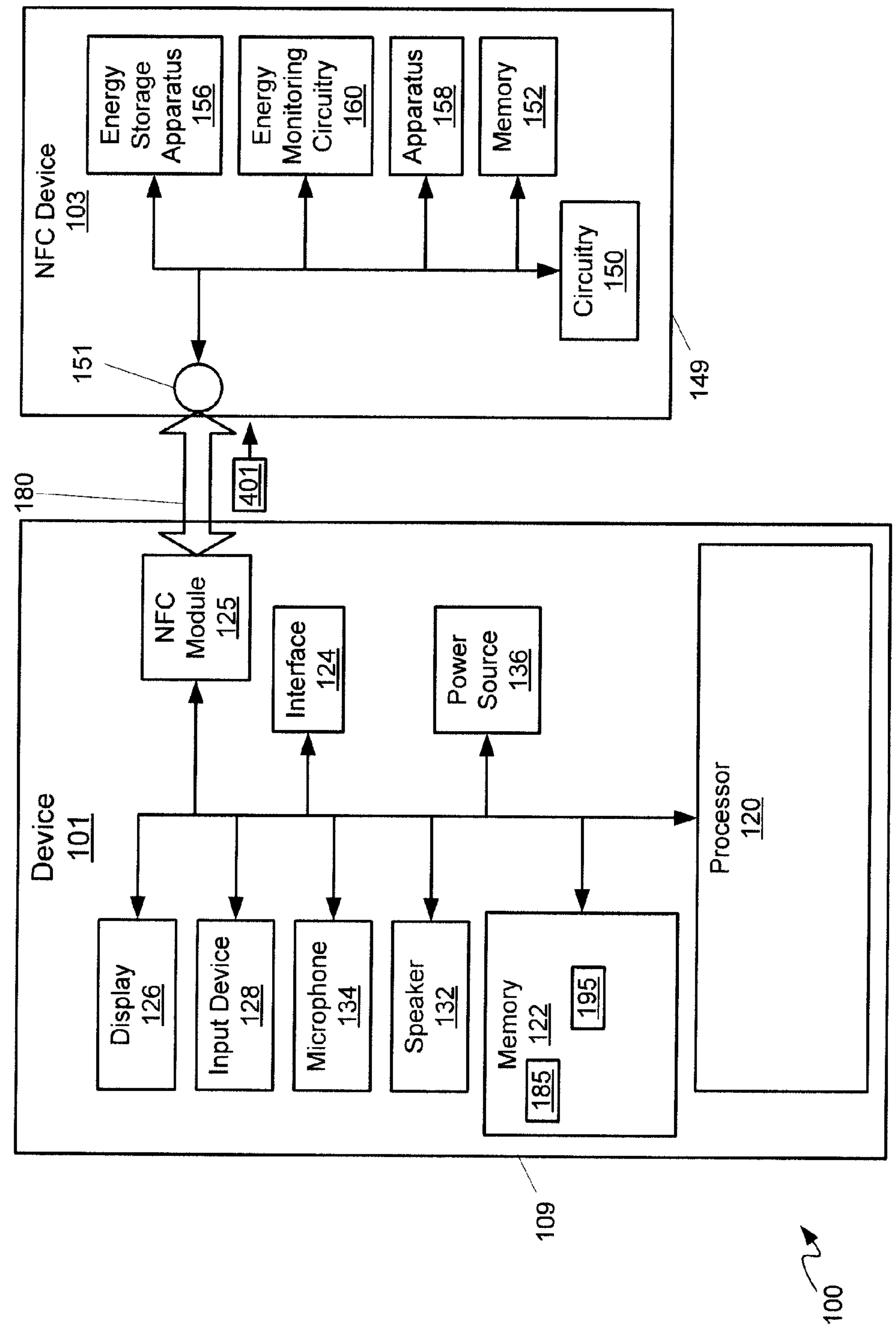
FIG. 4 depicts the system of FIG. 1, with the device querying the NFC device for energy data, according to non-limiting implementations.

Attention is next directed to FIG. 4 which depicts system 100 in a state prior to transmission of energy data 162. One or more of processor 120 and circuitry 150 can determine that a given function is to be implemented at NFC device 103, for example a refresh of apparatus 158, assuming apparatus 158 comprises a display. As the data to refresh apparatus 158 will be transmitted from device 101 to NFC device 103 in link 180, processor 120 implements method 300, for example by processing application 185, to ensure that NFC device 103 has enough energy to implement the refresh function.

Figure 5:
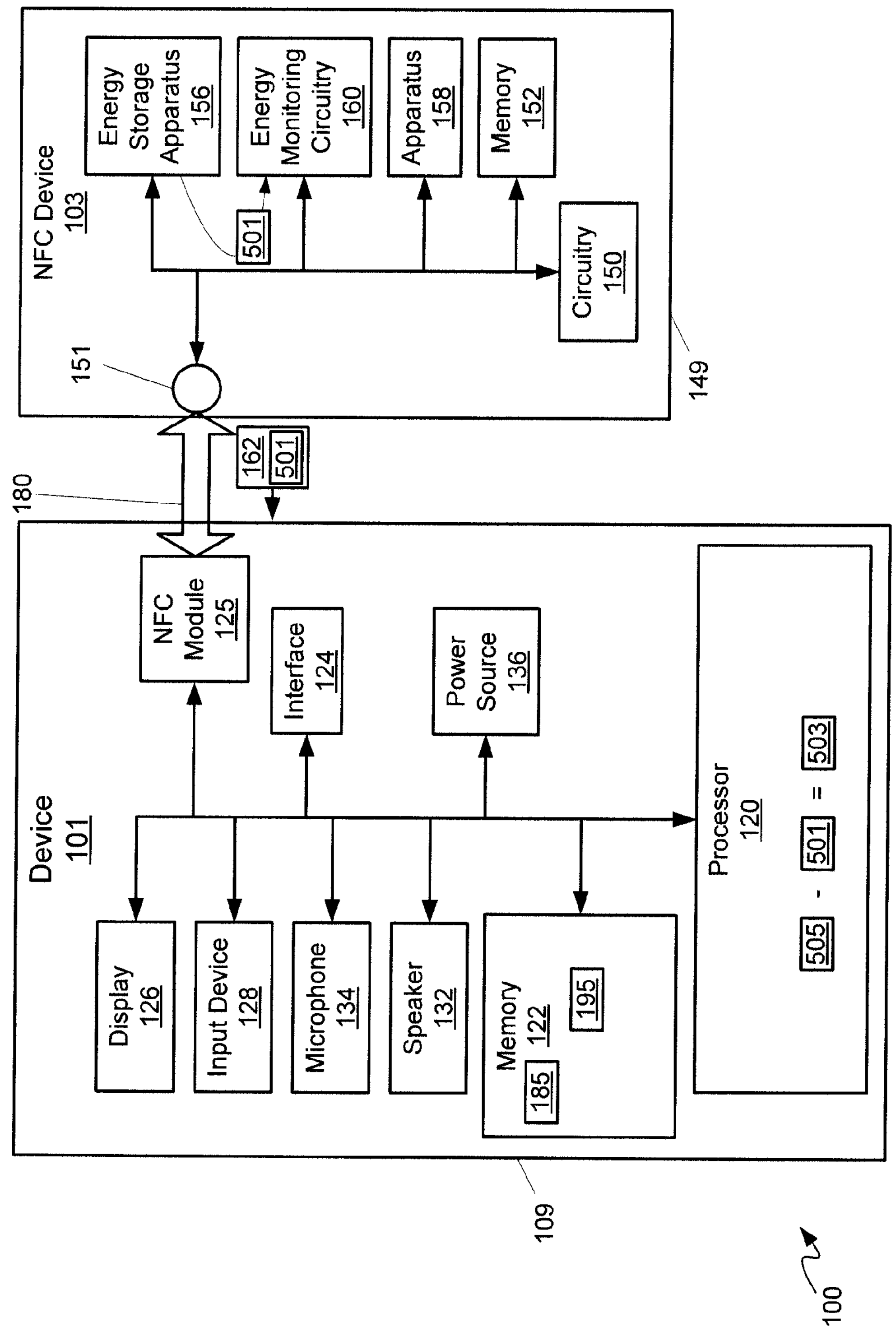
FIG. 5 depicts the system of FIG. 1, with the device receiving energy data from the NFC device, and determining, from the energy data, a difference between a current energy level of an energy storage apparatus at the NFC device and a given amount of energy for performing a given function at the NFC device, according to non-limiting implementations.

Hence, processor 120 queries, using NFC module 125, NFC device 103 for energy data 162, for example by transmitting a query 401 to NFC device 103 using link 180. When NFC device 103 receives query 401, circuitry 150 can cause energy monitoring circuitry 160 to determine a current energy level of energy storage apparatus 156, when not already determined. For example, energy monitoring circuitry 160 can be configured to one or more of determine a current energy level energy storage apparatus 156 periodically and when triggered to do so. When the former, current energy level of energy storage apparatus 156 can be stored at memory 152, and updated each time energy monitoring circuitry 160 determines a current energy level energy storage apparatus 156. As depicted in FIG. 5, in response to receiving query 401, data 501 indicative of a current energy level of energy storage apparatus 156 is determined by energy monitoring circuitry 160 and transmitted to device 101 in energy data 162 using link 180. Energy data 162 is received at device 101 (i.e. block 301).

As also depicted in FIG. 5, processor 120 then determines a difference 503 between a current energy level of energy storage apparatus 156 at the NFC device and a given amount of energy for performing the given function at NFC device 103 (i.e. block 303). In some implementations, difference 503 can be determined from data 501 (indicative of a current energy level of energy storage apparatus 156) and data 505 indicative of the given amount of energy for performing the given function at NFC device 103. Data 505 can be retrieved from data 195.

For example attention is directed to FIG. 6 which depicts an example non-limiting data structure for data 195 in which various functions that can be implemented at NFC device 103 are stored in association with data 505, 601, 603 indicative of respective amounts of energy for implementing the various functions. In FIG. 6, data 195 is depicted as storing: data 505, indicative of an amount of energy for refreshing apparatus 158; data 601, indicative of an amount of energy for turning on apparatus 158; and data 603, indicative of an amount of energy for transmitting data stored in memory 152. While data 195 is depicted in rows and columns, data 195 can have any data structure suitable for tables, databases, lookup tables and the like. Further, while natural words are used in FIG. 6 to indicate various functions of NFC device 103, in other implementations, codes, alphanumeric text, symbols, and the like can be used to indicate a given function. In addition, while three functions are stored in data 195, in other implementations, more than three functions, or fewer than three functions, can be stored in data 195.

It is further appreciated that a format of data 505, 601, 603, and indeed data 501, and difference 503 can be any format indicative of power, energy, and the like. Further, data 501, 505, 601, 603 (and difference 503) can be unitless and/or provided with units associated with power, energy, time (e.g. time for charging energy storage apparatus 156 to an associated given energy level using link 180) and the like.

Figure 7:
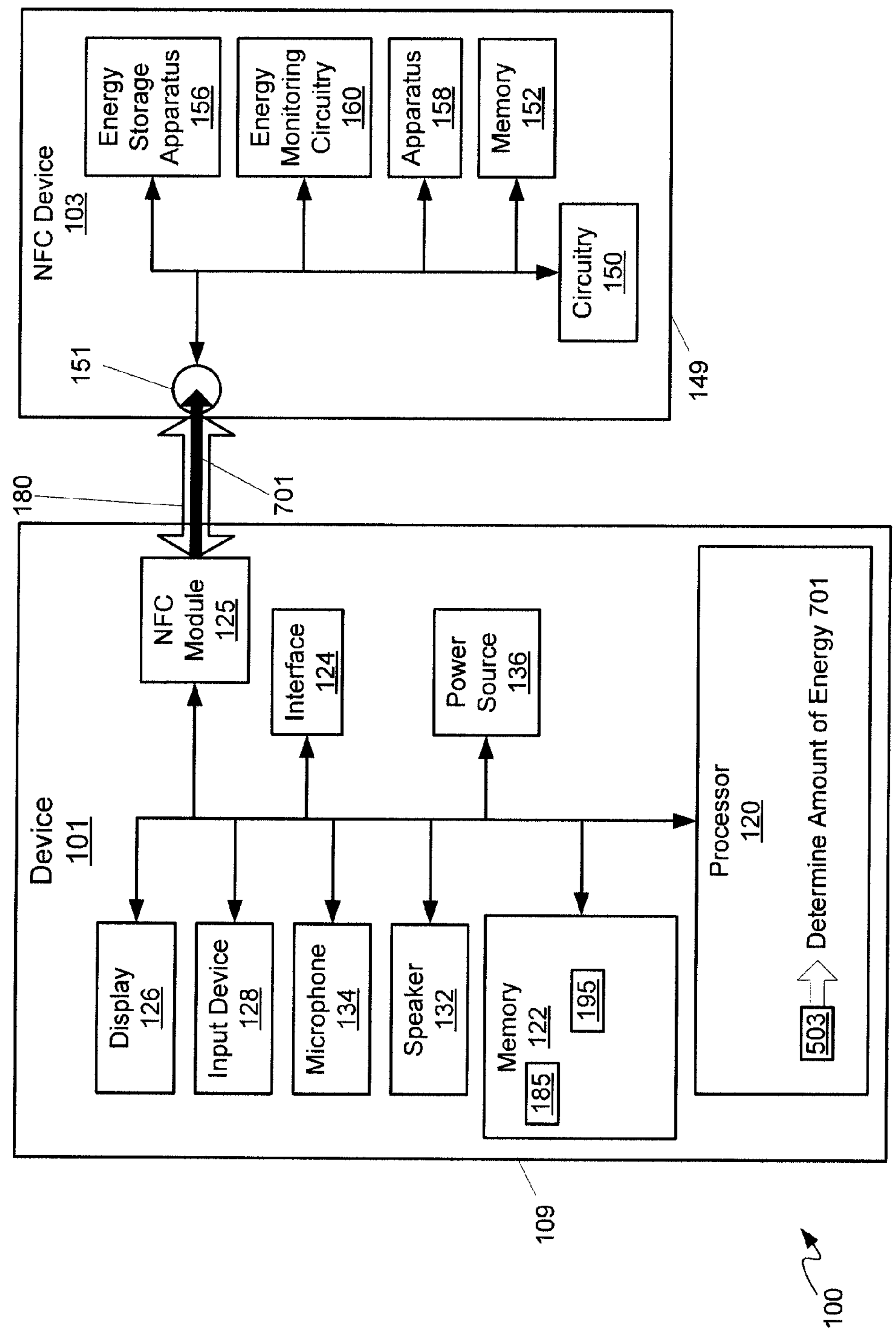
FIG. 7 depicts the system of FIG. 1, with the device transmitting an amount of energy corresponding to the difference, to the NFC device, according to non-limiting implementations.

Turning next to FIG. 7, once difference 503 is determined, processor 120 transmits, using NFC module 125, an amount of energy 701 corresponding to difference 503, to NFC device 103 (i.e. block 305), for example by turning on an antenna feed (not depicted) at NFC module 125 for a time period corresponding to transmitting amount of energy 701 to antenna 151. Amount of energy 701 is then stored at energy storage apparatus 156 in order to perform the given function, such as refreshing apparatus 158. NFC device 103 can then implement the given function using the stored energy.

Amount of energy 701, corresponding to the difference 503, transmitted to NFC device 103 can be one or more of: about the same as difference 503; greater than difference 503; and, about difference 503 plus about a given percentage of difference 503. In general, it can be advantageous for amount of energy 701 to be greater than difference 503 to allow for variations in energy usage when implementing the associated function at NFC device 103. When amount of energy 701 is to be greater than difference 503, application 185 can store a given percentage value that can be used to calculate amount of energy 701 once difference 503 is determined, for example "10%" so that about difference 503 plus about 10% of difference 503 of energy is transmitted to NFC device 103 at block 305. Hence, in these implementations, processor 120 can further determine amount of energy 701 corresponding to difference 503, as depicted in FIG. 7.

In any event, rather than charge energy storage apparatus 156 to its maximum storage capacity, device 101 transmits amount of energy 701 for performing a given function, thereby reducing a drain on power source 136, as generally amount of energy 701 is drawn from power source 136. The energy savings can hence be about equal to a difference between a second amount of energy for completely charging energy storage apparatus 156 at NFC device 103 and amount of energy 701. Indeed, amount of energy 701 transmitted to NFC device 103 is generally less than the second amount of energy for completely charging energy storage apparatus 156 at NFC device 103. The life of power source 136 is thereby extended as compared to devices that completely charge an energy storage apparatus at an NFC device.

In some implementations, when amount of energy 701 to be transmitted to NFC device 103 exceeds a second amount for completely charging energy storage apparatus 156 at NFC device 103, for example to maximum capacity, processor 120 can transmit, using NFC module 125, the second amount of energy to NFC device 103 rather than amount of energy 701 corresponding to difference 503. Indeed, once the second amount of energy is exceeded, energy storage apparatus 156 cannot store the additional energy and it can be wasted, needlessly draining power source 136. While this can lead to NFC device 103 only partially implementing the given function, device 101 can either transmit a remaining amount of energy 701 in a further energy transmission event at a later time and/or wait until NFC device 103 requests the remaining amount of energy 701, for example once energy storage apparatus 156 is at less than maximum capacity, as determined by energy monitoring circuitry 160.

Figure 8:
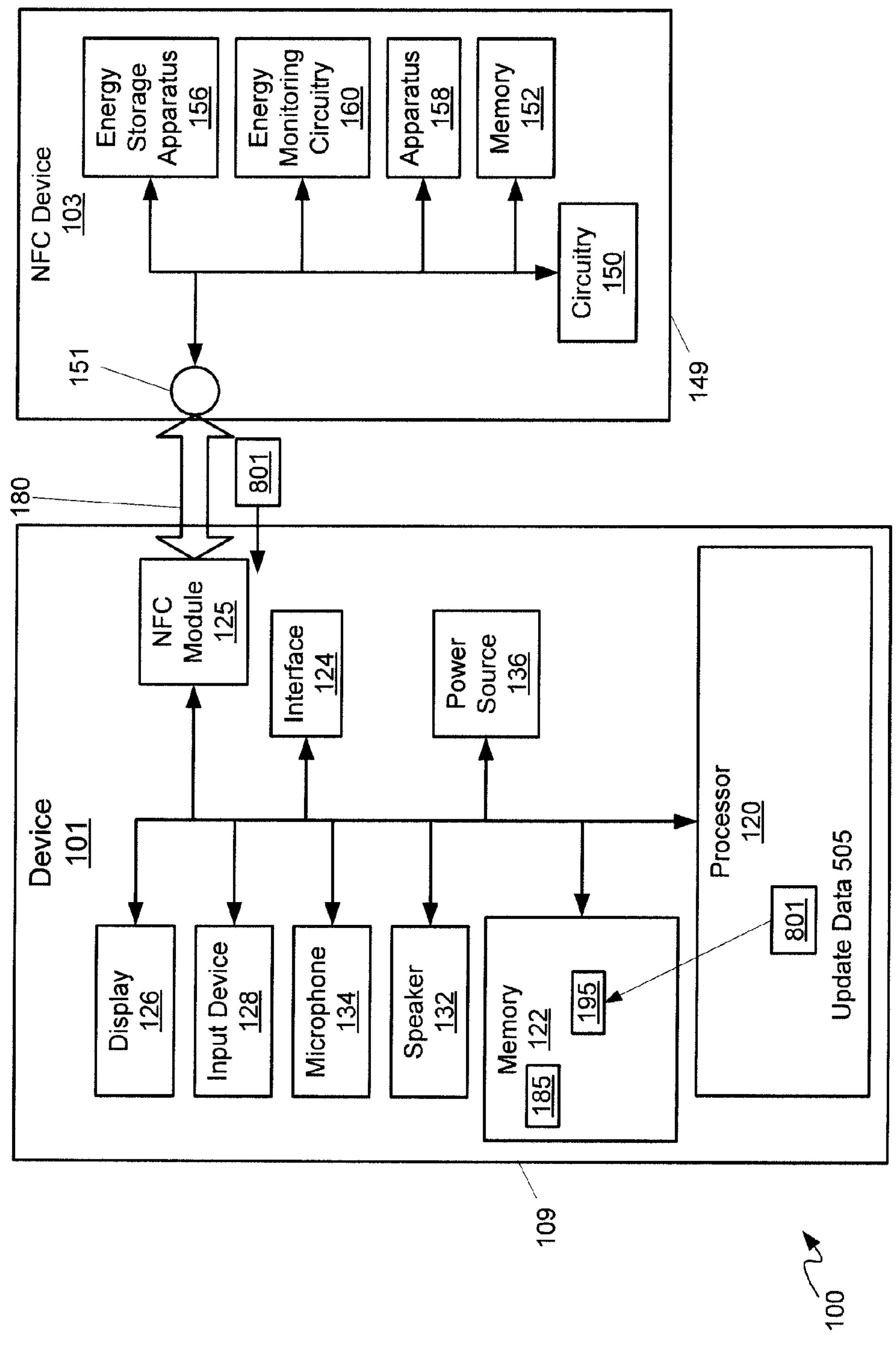
FIG. 8 depicts the system of FIG. 1, with the device receiving, from the NFC device, data indicative of the amount of energy last used to implement a given function, the data used to update the data of FIG. 6, according to non-limiting implementations.

In some optional implementations, as depicted in FIG. 8, once the given function is implemented, NFC device 103 can determine an amount of energy used for implementing the given function, for example using energy monitoring circuitry 160 to determine changes in energy at energy storage apparatus 156 before and after (and optionally during) implementation of the given function. NFC device 103 can then optionally transmit data 801 to device 101, data 801 indicative of the amount of energy used to implement the given function. Hence, data 801 is indicative of one or more of statistics and historical data for performing the given function. Data 801 can be processed by device 101 to update data 505 stored at data 195 so that, when the given function is next implemented, the given amount of energy for performing the given function can be based on one or more of statistics and historical data for previously performing the given function.

Furthermore, transmission of amount of energy 701 can occur over a given time period; in other words, an amount of time over which transmission of amount of energy 701 can occur, can depend on the actual amount of energy 701, as well as link 180 and/or a rate of energy that can be transferred to NFC device 103 using link 180. For example, in some implementations, it can take a long time to transmit amount of energy 701, including, but not limited to, about an hour, though such times can vary based on various parameters in system 100, including, but not limited to NFC module 125, NFC device 103, link 180, etc.; such long times for transmitting amount of energy 701 can further occur when an energy intensive function is to be implemented, and amount of energy 701 is hence relatively large, and/or when a current energy level of energy storage apparatus 156 is relatively low. Hence, device 101 can be further configured to determine an amount of time to transfer amount of energy 701. For example, data 195 can further include an amount of time and/or a history and/or statistics and/or a timestamp for transferring amount of energy 701, and/or memory 122 can be configured with a rate of energy transfer in link 180.

Hence, as the amount of time for transferring amount of energy 701 can be large in comparison to an amount of time for implementing the associated given function, in yet further optional implementations, device 101 and/or processor 120 can be configured to estimate when NFC device 103 may implement a given function and hence need energy to implement the given function. Such an estimation can be colloquially referred to as a "look ahead" function in that device 101 and/or processor 120, looks ahead to determine what functions might be implemented at NFC device 103, and further when they might be implemented, and how much energy will be needed to implement them. For example, device 101 can track operation of apparatus 158 and using one or more of data 195, application 145, and data exchange with NFC device 103, determine when NFC device 103 may implement a given function. Device 101 can then implement method 300 to determine an amount of energy 701 to transmit using method 300, and further determine when to transmit amount of energy 701. Device 101 can then initiate transmission of amount of energy 701 at a time prior to an estimated time for implementing the associated given function. In particular, a difference between a time when transmission of amount of energy 701 begins and the estimated time for implementing the associated given function can be greater than or about equal to an amount of time for transmitting amount of energy 701. It is appreciated that, in some of these implementations, device 101 and NFC device 103 can be physically mated, for example as in FIG. 2, so that transmission of amount of energy 701 is not interrupted.

In yet further implementations, device 101, and/or processor 120, can be further configured to determine a current energy level at power source 136, for example when before and/or during implementation of method 300; when amount of energy 701 is greater than the current energy level of power source 136, and/or when amount of energy 701 is a given percentage of the current energy level of power source 136 (e.g. in a range of about 90% to about 110% of the current energy level, though other percentages are within the scope of present implementations), processor 120 can control display 126 to provide a low battery indicator to prompt a user of device 101 to charge power source 136 in advance of, and/or during, transmission of amount of energy 701. This can assist with mitigating situations where either power source 136 does not currently store enough energy to transfer to NFC device 103 and/or situations where transmission of amount of energy 701 would leave power source 103 drained and/or almost drained.

As described above, in FIGS. 4 through 8, it is assumed that device 101 determines when a function is to be implemented at NFC device 103. However, in other implementations, an NFC device can determine when a function is to be implemented at NFC device 103. Such implementations are next described with reference to FIGS. 9 to 10. Each of FIGS. 9 to 10 are similar to FIG. 1, with like elements having like numbers, but with an "a" appended thereto. Hence, FIG. 9 depicts a system 100*a* that includes a device 101*a* and an NFC device 103*a*. Device 101*a* comprises a housing 109*a*, which houses a processor 120*a* interconnected with a memory 122*a*, a communications interface 124*a*, an NFC module 125*a* (and/or a short range RF (radio-frequency) sensor), a display 126*a*, and an input device 128*a*, and optionally a speaker 132*a*, and a microphone 134*a*. Device 101*a* further comprises a power source 136*a*, including, but not limited to, a battery. Memory 122*a* stores an application 185*a* (similar to application 185) and data 195*a* corresponding to amounts of energy for performing respective functions at NFC device 103*a*. NFC module 125*a* will be interchangeably referred to hereafter as NFC module 125*a*. NFC device 103*a* comprises a housing 149*a*, which houses NFC circuitry 150*a* interconnected with an NFC antenna 151*a*, a memory 152*a*, an energy storage apparatus 156*a* and optionally an apparatus 158*a*.

In system 100*a*, memory 152*a* stores data 995, similar to data 195 depicted in FIG. 6; however, data 995 can comprise at least indicators of various functions that can be performed by NFC device 103*a*, similar to corresponding indicators in data 195*a*. Data 995 can optionally comprise data indicative of amounts of energy for implementing those functions.

In system 100*a*, circuitry 150*a* determines that a given function is to be implemented and responsively transmits energy data to device 101*a* using link 180*a*, in effect to request that energy be transmitted from device 101*a* so that given function can be implemented. Energy data 162*a* is similar to energy data 162, however energy data 162*a* comprises both data 501*a* (indicative of a current energy level of energy storage apparatus 156*a* at NFC device 103*a*, as determined by energy monitoring circuitry 160*a*) and an indication 996 of the given function to be performed at NFC device 103*a*, as retrieved from data 995.

Processor 120*a* receives (i.e. at block 301), from NFC module 125*a*, energy data 162*a* comprising: data 501*a* indicative of the current energy level of energy storage apparatus 156*a* at NFC device 103*a* and an indication of the given function to be performed at NFC device 103*a*. As depicted in FIG. 10, processor 120*a* determines a difference 503*a* (i.e. at block 303) between a current energy level of energy storage apparatus 156*a* at NFC device 103*a*, as received in data 501*a*, and a given amount of energy for performing a given function at NFC device 103*a*, for example using data 505*a* as retrieved from data 195*a* using indication 996, data 505*a* similar to data 505 described above. In other words, processor 120 determines difference 503*a*, at least in part, by retrieving data 505*a* indicative of the given amount of energy for performing the given function at NFC device 103*a* from memory 122*a* using indication 996.

Device 101*a* then transmits (i.e. at block 305), using NFC module 125*a*, an amount of energy 701*a* corresponding to difference 503*a*, to NFC device 103*a*, as described above with reference to FIG. 7. NFC device 103*a* can then implement the given function using the stored energy.

In some implementations of system 100*a*, data 195*a* can be optional and/or omitted. In these implementations, data 995 can comprise data indicative of given amounts of energy for performing respective given functions at the NFC device, and NFC device 103*a* can transmit, in energy data 162*a*, the given amount of energy for performing the given function at NFC device 103*a* with data 501*a* so that device 101*a* can determine difference 503*a*.

In FIGS. 4 through 10 it is assumed that devices 101, 101*a* determine a difference between a current energy level of an energy storage apparatus at an NFC device and a given amount of energy for performing a given function at the NFC device. However, in other implementations, the determination of the difference can occur at the NFC device. Such implementations are next described with reference to FIGS. 11 to 12. Each of FIGS. 11 to 12 are similar to FIG. 9, with like elements having like numbers, but with a "b" appended thereto rather than an "a". Hence, FIG. 11 depicts a system 100*b* that includes a device 101*b* and an NFC device 103*b*. Device 101*b* comprises a housing 109*b*, which houses a processor 120*b* interconnected with a memory 122*b*, a communications interface 124*b*, an NFC module 125*b* (and/or a short range RF (radio-frequency) sensor), a display 126*b*, and an input device 128*b*, and optionally a speaker 132*b*, and a microphone 134*b*. Device 101*b* further comprises a power source 136*b*, including, but not limited to, a battery. Memory 122*b* stores an application 185*b* similar to application 185, but does not store data similar to data 195, 195*a* (though such data can optionally be stored in memory 122*b*). NFC module 125*b* will be interchangeably referred to hereafter as NFC module 125*b*. NFC device 103*b* comprises a housing 149*b*, which houses NFC circuitry 150*b* interconnected with an NFC antenna 151*b*, a memory 152*b*, an energy storage apparatus 156*b* and optionally an apparatus 158*b*. In system 100*b*, memory 152*b* stores data 995*b*, similar to data 195 depicted in FIG. 6.

In system 100*b*, circuitry 150*b* can determine that a given function is to be implemented. Alternatively, device 101*b* can request, using link 180*b*, that NFC device 103*b* implement the given function. Either way, and in contrast to systems 100, 100*a*, in system 100*b* circuitry 150*b* responds to a determination that a given function is to be implemented by calculating a difference 503*b* between a current energy level of energy storage apparatus 156*b* (as indicated by data 501*b* determined by and received from energy monitoring circuitry 160*b*) and a given amount of energy for performing the given function at NFC device 103*b* (as indicated by data 505*b* retrieved from data 995, data 505*b* similar to data 505), for example using data 505*b* as retrieved from data 995*b* which is similar to data 195 of FIG. 6, described above.

Circuitry 150*b* then transmits energy data 162*b* to device 101*b* using link 180*b*, energy data 162*b* comprising difference 503*b*, in effect to request that energy be transmitted from device 101*b* so that given function can be implemented.

Processor 120*b* receives (i.e. at block 301), from NFC module 125*b*, energy data 162*b* comprising difference 503*b*, and determines difference 503*b* (i.e. block 303) from energy data 162*b*, for example by extracting difference 503*b* from energy data 162*b*. Device 101*b* then transmits (i.e. at block 305), using NFC module 125*b*, an amount of energy 701*b* corresponding to difference 503*b*, to NFC device 103*b*, as described above with reference to FIG. 7. NFC device 103*b* can then implement the given function using the stored energy.

While it is appreciated that the methods described herein could also be used with non-portable devices, the methods may be especially advantageous for mobile electronic devices that are handheld and are powered using a mobile power source and/or a battery. In particular, by transferring an amount of energy to an NFC device that corresponds to an amount of energy for performing given function, rather than attempting to keep an energy storage apparatus at the NFC device completely charged, the life of the power source and/or battery at the mobile electronic device can be extended and/or improved. This further leads to extending an operating time of the mobile electronic device as the energy saved by limiting energy transferred to the NF device can be used to operate the mobile electronic device for a longer period of time. Further, wear on the power source and/or battery at the mobile operating device is reduced. Implementation of one or more embodiments may realize one or more additional benefits as well, such as flexibility of implementation. Further, this disclosure can be adapted to a variety of mobile electronic devices. In addition, while it is appreciated that the methods described herein could also be used with active NFC devices, the methods may be especially advantageous for use with passive NFC devices which are powered entirely from devices with which the passive NFC devices are mated.

Those skilled in the art will appreciate that in some implementations, the functionality of devices 101, 101*a*, 101*b* and NFC devices 103, 103*a*, 103*b* can be implemented using pre-programmed hardware or firmware elements (e.g., application specific integrated circuits (ASICs), electrically erasable programmable read-only memories (EEPROMs), etc.), or other related components. In other implementations, the functionality of devices 101, 101*a*, 101*b* and NFC devices 103, 103*a*, 103*b* can be achieved using a computing apparatus that has access to a code memory (not shown) which stores computer-readable program code for operation of the computing apparatus. The computer-readable program code could be stored on a computer-readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer-readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A device comprising:

a module configured to: exchange data with a near field communication (NFC) device; and transmit energy to the NFC device; and, a processor configured to:

receive, using the module, energy data from the NFC device, the energy data comprising data for determining a difference between a current energy level of an energy storage apparatus at the NFC device and a given amount of energy for performing a given function at the NFC device;

determine the difference from the energy data; and, transmit, using the module, an amount of energy corresponding to the difference, to the NFC device.

2. The device of claim 1, wherein the energy data comprises one or more of:

the current energy level of the energy storage apparatus at the NFC device;

the given amount of energy for performing the given function at the NFC device; and, the difference there between.

3. The device of claim 1, wherein the amount of energy, corresponding to the difference, which is transmitted to the NFC device is one or more of: about the same as the difference; greater than the difference; and, about the difference plus a given percentage of the difference.

4. The device of claim 1, wherein the processor is further configured to:

determine a current energy level of a power source at the device; and, when one or more of: the amount of energy is greater than a current energy level of the power source; and, the amount of energy is within a given percentage of the current energy level of the power source, control a display of the device to provide a prompt for charging the power source.

5. The device of claim 1, wherein the processor is further configured to, when the amount of energy to be transmitted to the NFC device exceeds a second amount of energy for completely charging the energy storage apparatus at the NFC device, transmit, using the module, the second amount of energy to the NFC device rather than the amount of energy corresponding to the difference.

6. The device of claim 1, wherein the processor is further configured to:

estimate when the given function is to occur; and begin transmission of the amount of energy at a time prior to an estimated time for implementing the given function, such that a difference between the time when transmission of amount of energy begins, and the estimated time for implementing the given function, is greater than or about equal to an amount of time for transmitting amount of energy.

7. The device of claim 1, further comprising a memory for storing data corresponding to amounts of energy for performing respective functions at the NFC device.

8. The device of claim 7, wherein the processor is further configured to receive, from the module, the energy data comprising: the current energy level of the energy storage apparatus at the NFC device and an indication of the given function to be performed at the NFC device.

9. The device of claim 8, wherein the processor is further configured to determine the difference by retrieving the given amount of energy for performing the given function at the NFC device from the memory using the indication.

10. The device of claim 1, wherein the given amount of energy for performing the given function is based on one or more of statistics and historical data for previously performing the given function.

11. A method comprising:

at a device comprising: a module configured to: exchange data with a near field communication (NFC) device; and transmit energy to the NFC device; and, a processor, receiving, at the processor, using the module, energy data from the NFC device, the energy data comprising data for determining a difference between a current energy level of an energy storage apparatus at the NFC device and a given amount of energy for performing a given function at the NFC device;

determining, using the processor the difference from the energy data; and, transmitting, using the module, an amount of energy corresponding to the difference, to the NFC device.

12. The method of claim 11, wherein the energy data comprises one or more of:

the current energy level of the energy storage apparatus at the NFC device;

the given amount of energy for performing the given function at the NFC device; and, the difference there between.

13. The method of claim 11, wherein the amount of energy, corresponding to the difference, which is transmitted to the NFC device is one or more of: about the same as the difference; greater than the difference; and, about the difference plus a given percentage of the difference.

14. The method of claim 11, further comprising:

determining a current energy level of a power source at the device; and, when one or more of: the amount of energy is greater than a current energy level of the power source; and, the amount of energy is within a given percentage of the current energy level of the power source, controlling a display of the device to provide a prompt for charging the power source.

15. The method of claim 11, further comprising, when the amount of energy to be transmitted to the NFC device exceeds a second amount of energy for completely charging the energy storage apparatus at the NFC device, transmitting, using the module, the second amount of energy to the NFC device rather than the amount of energy corresponding to the difference.

16. The method of claim 11, further comprising:

estimating when the given function is to occur; and, beginning transmission of the amount of energy at a time prior to an estimated time for implementing the given function, such that a difference between the time when transmission of amount of energy begins, and the estimated time for implementing the given function, is greater than or about equal to an amount of time for transmitting amount of energy.

17. The method of claim 11, further comprising, storing at a memory of the device, data corresponding to amounts of energy for performing respective functions at the NFC device.

18. The method of claim 17, further comprising receiving, from the module, the energy data comprising: the current energy level of the energy storage apparatus at the NFC device and an indication of the given function to be performed at the NFC device.

19. The method of claim 18, further comprising, determining the difference by retrieving the given amount of energy for performing the given function at the NFC device from the memory using the indication.

20. A computer program product, comprising a non-transitory computer usable medium having a computer-readable program code adapted to be executed to implement a method comprising:

at a device comprising: a module configured to: exchange data with a near field communication (NFC) device; and transmit energy to the NFC device; and, a processor, receiving, at the processor, using the module, energy data from the NFC device, the energy data comprising data for determining a difference between a current energy level of an energy storage apparatus at the NFC device and a given amount of energy for performing a given function at the NFC device;

determining, using the processor the difference from the energy data; and, transmitting, using the module, an amount of energy corresponding to the difference, to the NFC device.

* * * * *